United States Patent
Snow, Jr.

(10) Patent No.: US 7,442,230 B2
(45) Date of Patent: Oct. 28, 2008

(54) METHOD AND APPARATUS FOR GENERATING AN INERT GAS ON A VEHICLE

(75) Inventor: Donald R. Snow, Jr., Fountain Valley, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 11/684,388

(22) Filed: Mar. 9, 2007

(65) Prior Publication Data

US 2007/0144347 A1 Jun. 28, 2007

Related U.S. Application Data

(62) Division of application No. 10/813,217, filed on Mar. 30, 2004, now Pat. No. 7,204,868.

(51) Int. Cl.
*B01D 53/22* (2006.01)
(52) U.S. Cl. ............... 95/1; 95/39; 95/90; 96/4; 96/135; 96/417; 96/420; 96/421; 96/422
(58) Field of Classification Search ............. 95/1, 95/39, 90; 55/315, 385.3; 96/4, 135, 417, 96/420, 421, 422
See application file for complete search history.

(56) References Cited

U.S. PATENT DOCUMENTS

| | | | |
|---|---|---|---|
| 3,587,618 A | 6/1971 | Kenyon | |
| 4,681,602 A | 7/1987 | Glenn et al. | |
| 5,388,413 A | 2/1995 | Major et al. | |
| 6,319,305 B1 | 11/2001 | Phillips et al. | |
| 6,478,852 B1 | 11/2002 | Callaghan et al. | |
| 6,729,359 B2 | 5/2004 | Jones | |
| 2004/0141836 A1 | 7/2004 | McAuliffe et al. | |

OTHER PUBLICATIONS

Moravec et al., U.S. Appl. No. 10/707,913, filed Feb. 10, 2004, for Commercial Aircraft On-Board Inerting System.
"Nitrogen Membrane Applications", retrieved on Aug. 29, 2002, at http://www.airliquide.com/ww/chapter02/medal/en/obiggs.htm, 2 pages.
OBIGGS, "On-Board Inert Gas Generation", retrieved on Aug. 29, 2002 at http://www.airproducts.com/membranes/page02.asp, 4 pages.

*Primary Examiner*—Robert A Hopkins
(74) *Attorney, Agent, or Firm*—Lee & Hayes, PLLC

(57) ABSTRACT

An inert gas generating system for generating inert gas on a vehicle having a fuel tank and a fuel tank vent. The system includes an inlet for receiving a flow of gas having a nitrogen component and an oxygen component from a gas source, a heat exchanger downstream from the inlet and in fluid communication with the inlet for cooling gas received from the inlet, and a gas separation module downstream from the heat exchanger and in fluid communication with the heat exchanger for separating gas received from the heat exchanger into a nitrogen-enriched gas flow and an oxygen-enriched gas flow. The gas separation module is adapted to deliver nitrogen-enriched gas from the nitrogen-enriched gas flow to the fuel tank without delivering the nitrogen-enriched gas through the fuel tank vent. The gas separation module is also adapted to deliver nitrogen-enriched gas from the nitrogen-enriched gas flow to the fuel tank vent.

20 Claims, 4 Drawing Sheets

METHOD AND APPARATUS FOR GENERATING AN INERT GAS ON A VEHICLE

CROSS REFERENCE TO RELATED APPLICATIONS

This patent application is a divisional application of co-pending, commonly-owned U.S. patent application Ser. No. 10/813,217 entitled "Method and Apparatus for Generating an Inert Gas on a Vehicle" filed on Mar. 30, 2004, which application is incorporated herein by reference.

GOVERNMENT LICENSE RIGHTS

This invention was made with Government support under contract number F33657-96-C-2059, awarded by the U.S. Air Force. The government has certain rights in this invention.

BACKGROUND OF THE INVENTION

The present invention relates generally to vehicle compartments, and more specifically to supplying vehicle compartments (e.g., a fuel tank) with an inert gas to prevent the compartments from combusting.

It is well known to supply an inert gas, such as nitrogen-enriched air (NEA), to the ullages (i.e., the portion of a tank above the liquid) of an aircraft fuel tank to prevent the tank from combusting. In the past, storage tanks on the aircraft have been charged with compressed NEA from an external source to supply the fuel tanks during flight. Currently, some aircraft include on-board inert gas generating systems (OBIGGS) for generating the NEA on-board the aircraft from conditioned engine bleed air. However, some OBIGGS may not generate the NEA at a flow rate sufficient to ensure the gas above the fuel in the tank is incombustible during some operating conditions of the aircraft. This may be particularly true for transport aircraft with large fuel tanks. The OBIGGS therefore compresses and stores the excess NEA it generates during periods of low demand in storage tanks on the aircraft for supplying the fuel tanks later during flight. The stored NEA is regulated to a lower pressure and delivered to the fuel tanks. When the aircraft is being refueled, fresh fuel flows through scrubbers to remove dissolved oxygen that would otherwise escape from the fuel and fill the ullages.

Because the OBIGGS may not generate the NEA fast enough to fully charge the system during short flights, flight crews may be required to project usage of NEA and charge the storage tanks accordingly before flight. Additionally, the stored NEA is gradually consumed as the ullage temperature changes while the aircraft is parked. If the aircraft (and therefore the OBIGGS) is not operated daily, it may take several hours to supply the fuel tanks with sufficient NEA, making it difficult to quickly prepare the aircraft for flight. The storage compressors and tanks may need to be replaced periodically and can be difficult to remove due to their location, size, and weight. Furthermore, potential leakage from the storage tanks and associated components may require maintenance personal to sample an oxygen level adjacent the OBIGGS before accessing the OBIGGS for maintenance. Even small leaks from the storage tanks and associated components may prevent the storage tanks from storing enough NEA to sufficiently supply the fuel tank so the gas above the fuel is incombustible during descent of the aircraft.

SUMMARY OF THE INVENTION

In one aspect, the present invention includes an inert gas generating system for generating inert gas on a vehicle having a fuel tank and a fuel tank vent. The system includes an inlet for receiving a flow of gas having a nitrogen component and an oxygen component from a gas source, a heat exchanger downstream from the inlet and in fluid communication with the inlet for cooling gas received from the inlet, and a gas separation module downstream from the heat exchanger and in fluid communication with the heat exchanger for separating gas received from the heat exchanger into a nitrogen-enriched gas flow and an oxygen-enriched gas flow. The gas separation module is adapted to deliver nitrogen-enriched gas from the nitrogen-enriched gas flow to the fuel tank without delivering the nitrogen-enriched gas through the fuel tank vent. The gas separation module is also adapted to deliver nitrogen-enriched gas from the nitrogen-enriched gas flow to the fuel tank vent.

In another aspect, the present invention includes an aircraft including an airframe, a fuel tank mounted on the airframe, a fuel tank vent operatively connected to the fuel tank, and an inert gas generating system for generating inert gas on-board the aircraft. The inert gas generating system includes an inlet for receiving a flow of air from an air source, a heat exchanger downstream from the inlet and in fluid communication with the inlet for cooling air received from the inlet, and a gas separation module downstream from the heat exchanger and in fluid communication with the heat exchanger for separating air received from the heat exchanger into a nitrogen-enriched gas flow and an oxygen-enriched gas flow. The gas separation module is adapted to deliver nitrogen-enriched gas from the nitrogen-enriched gas flow to the fuel tank without delivering the nitrogen-enriched gas through the fuel tank vent. The gas separation module is also adapted to deliver nitrogen-enriched gas from the nitrogen-enriched gas flow to the fuel tank vent.

In another aspect, a method of generating inert gas on a vehicle is provided for supplying the inert gas to a fuel tank. The method includes supplying a flow of gas having a nitrogen component and an oxygen component to a gas separating module, separating the flow of gas into a nitrogen-enriched gas flow and an oxygen-enriched gas flow using the gas separating module, wherein the nitrogen-enriched gas flow has an oxygen concentration low enough that the nitrogen-enriched gas flow is generally inert, and delivering the nitrogen-enriched gas flow from the gas separating module to the fuel tank at a multiplicity of unique flow rates, wherein each unique flow rate of the multiplicity of unique flow rates corresponds to a different operating condition of the aircraft.

In another aspect, a method of generating inert gas on a vehicle is provided for supplying the inert gas to a fuel tank having a fuel tank vent. The method includes supplying a flow of gas having a nitrogen component and an oxygen component to a gas separating module, separating the flow of gas into a nitrogen-enriched gas flow and an oxygen-enriched gas flow using the gas separating module, wherein the nitrogen-enriched gas flow has an oxygen concentration low enough that the nitrogen-enriched gas flow is generally inert, delivering nitrogen-enriched gas from the nitrogen-enriched gas flow to the fuel tank without delivering the nitrogen-enriched gas through the fuel tank vent, and delivering nitrogen-enriched gas from the nitrogen-enriched gas flow to the fuel tank vent.

In another aspect, a method of generating inert gas on a vehicle is provided for supplying the inert gas to a fuel tank. The method includes supplying a flow of gas having a nitrogen component and an oxygen component to a gas separating module, separating the flow of gas into a nitrogen-enriched gas flow and an oxygen-enriched gas flow using the gas separating module, wherein the nitrogen-enriched gas flow has an oxygen concentration low enough that the nitrogen-enriched gas flow is generally inert, and delivering the nitrogen-enriched gas flow from the gas separating module to the fuel tank at a plurality of unique flow rates, wherein the flow of gas supplied to the gas separating module has a unique temperature for each unique flow rate of the plurality of unique flow rates.

In even another aspect, the present invention includes an inert gas generating system for generating inert gas on a vehicle having a fuel tank. The system includes an inlet for receiving a flow of gas having a nitrogen component and an oxygen component from a gas source, a heat exchanger downstream from the inlet and in fluid communication with the inlet for cooling gas received from the inlet, and a gas separation module downstream from the heat exchanger and in fluid communication with the heat exchanger for separating gas received from the heat exchanger into a nitrogen-enriched gas flow and an oxygen-enriched gas flow. The gas separation module is adapted to generate a flow rate of the nitrogen-enriched gas flow of about 40 pounds per minute with an oxygen content less than or equal to about 9.8 percent by volume.

Other features of the present invention will be in part apparent and in part pointed out hereinafter.

BREIF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
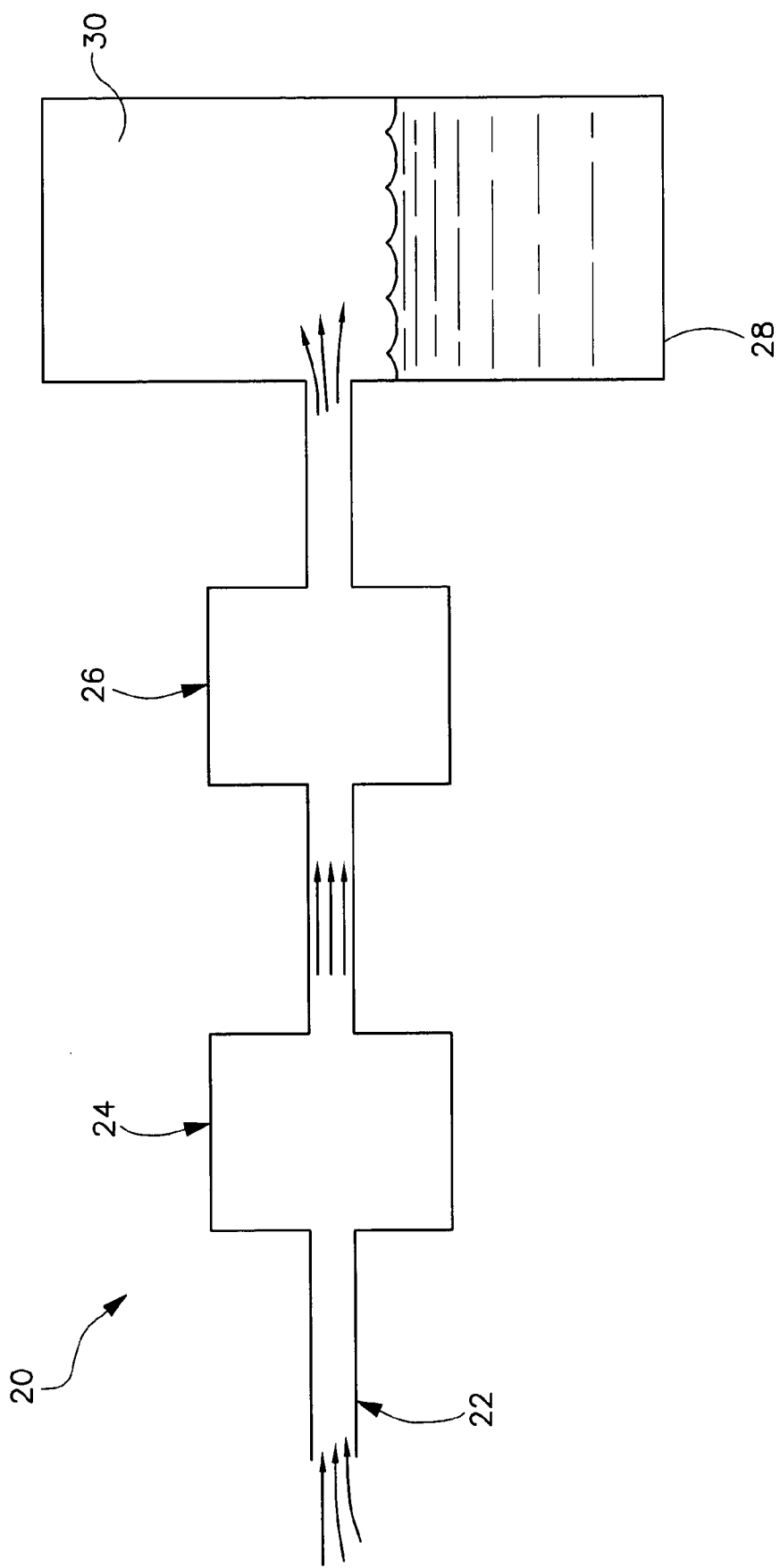
FIG. 1 is a schematic elevation of an inert gas generating system of the present invention.

Referring now to the drawings, and more specifically to FIG. 1, an inert gas generating system of the present invention is designated in its entirety by the reference numeral 20. The system 20 includes an inlet (generally designated by 22), a heat exchanger (generally designated by 24) downstream from and in fluid communication with the inlet, and a gas separation module (generally designated by 26) downstream from and in fluid communication with the heat exchanger. Generally, the inlet 22 receives a flow of gas from a gas source (not shown), the heat exchanger 24 cools gas received from the inlet 22, and the gas separation module 26 generates a generally inert gas flow from gas received from the heat exchanger. The system 20 supplies the inert gas flow to a fuel tank 28 of a vehicle (not shown) to ensure the gas above the fuel in the fuel tank is generally incombustible. More specifically, the system 20 supplies the inert gas flow to an ullage 30 of the fuel tank 28 to fill the ullage so the gas in the ullage remains generally inert and therefore the tank is generally incombustible. The gas separation module 26 is adapted to generate the inert gas flow at a multiplicity of flow rates each generally sufficient to keep the gas in the ullage 30 inert during particular operating conditions of the vehicle. Accordingly, a flow rate of inert gas sufficient to ensure the fuel tank is incombustible can be generated by the system 20 when the fuel tank 28 requires it during any operational condition of the vehicle. It is therefore not necessary to store any of the inert gas generated by the module 26 for future use or charge the system 20 with a predetermined amount of gas before operation of the vehicle. Rather, the inert gas remains flowing from the gas separating module to the fuel tank and does not stagnate between the module and the fuel tank.

Figure 2:
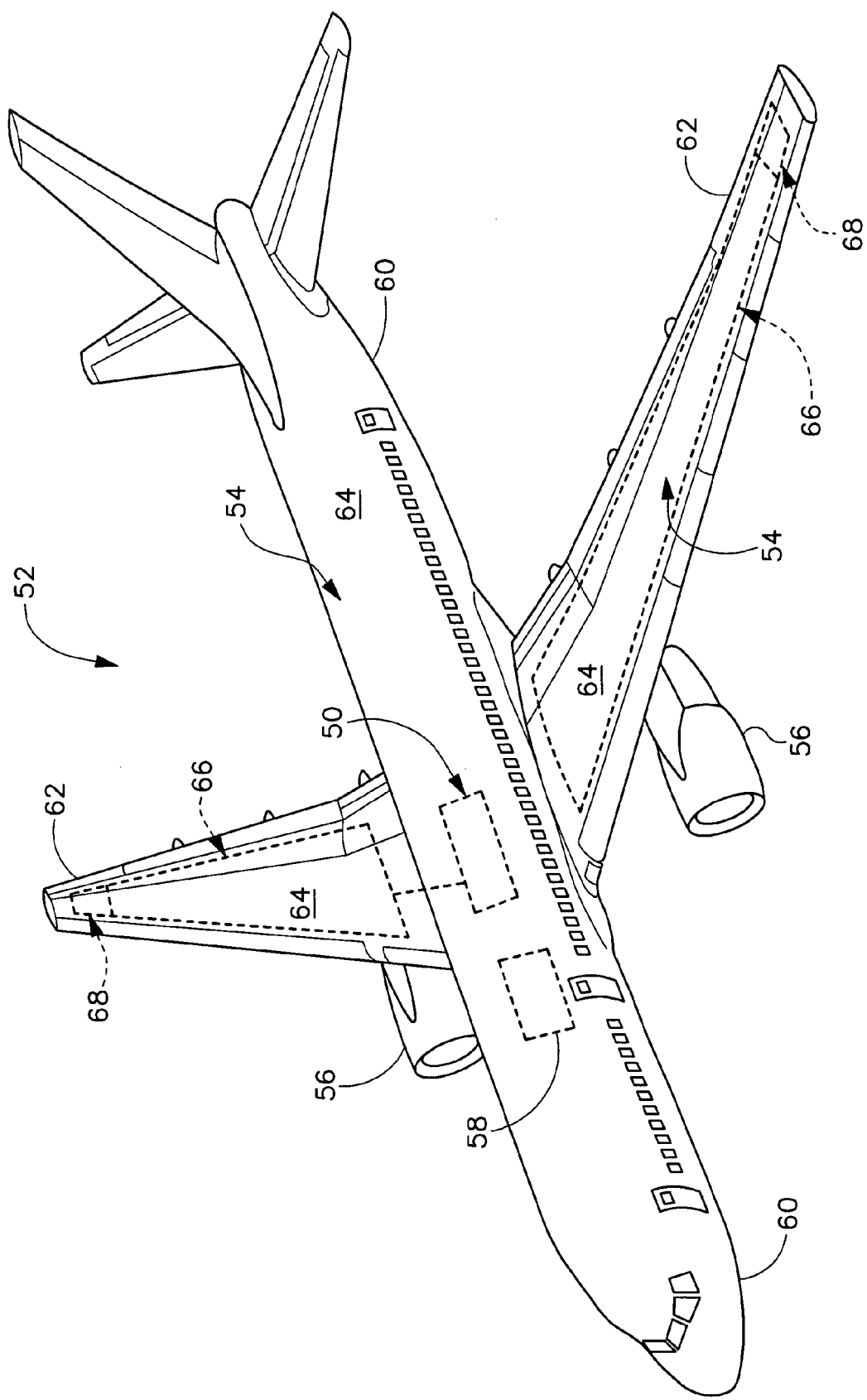
FIG. 2 is a perspective of an aircraft having an inert gas generating system of the present invention.

Although the inert gas generating system of the present invention is suitable for use with any vehicle, as illustrated in FIG. 2 an inert gas generating system (generally designated by 50) of the present invention is used to generate inert gas on an aircraft designated in its entirety by the reference numeral 52. The aircraft 52 includes an airframe (generally designated by 54), a plurality of power plants 56 (e.g., gas turbine engines), an environmental control system 58, and the inert gas generating system 50. The airframe 54 has a fuselage section 60 and a pair of wings 62 extending outward from the fuselage. Both the fuselage 60 and the wings 62 are covered in a skin forming an outer surface 64 of the aircraft 52. Each of the wings 62 includes a fuel tank (generally designated by 66) mounted on the airframe 54 for storing and supplying fuel to the power plants 56. The fuel tanks 66 each include a fuel tank vent (generally designated by 68) operatively connected to the respective tank for venting gas from the tank and supplying gas to the tank. The aircraft 52 may include other fuel tanks (not shown) mounted on other sections of the airframe 54, such as the fuselage 60, in addition to or in place of the fuel tanks 66. The power plants 56 are mounted on the airframe 54 for generating power to propel the aircraft 52. Although the aircraft 52 may have other power plants 56 without departing from the scope of the present invention, in the exemplary embodiment the power plants are gas turbine engines. Additionally, although the aircraft 52 is shown in FIG. 1 as including a plurality of power plants 56, the aircraft may include only one power plant without departing from the scope of the present invention.

The environmental control system 58 is mounted on the airframe 54 for receiving and conditioning air (e.g., bleed air from the power plant(s) 56) from an air source (e.g. ambient air entering the power plants 56) for delivery to passenger and/or crew compartments (not shown) of the aircraft 52, as is well known in the art. As is described in more detail below, the inert gas generating system 50 is mounted on the airframe 54 for generating inert gas on the aircraft 52, and is operatively connected to at least one of the fuel tanks 66 for supplying the inert gas to the tanks to ensure the gas in the tanks remains incombustible. Because most of the features of the aircraft 52 are conventional, general features of the aircraft will not be described in further detail. In one embodiment, the aircraft 52 is a C-17 aircraft, manufactured by The Boeing Company of Long Beach, Calif.

Figure 3:
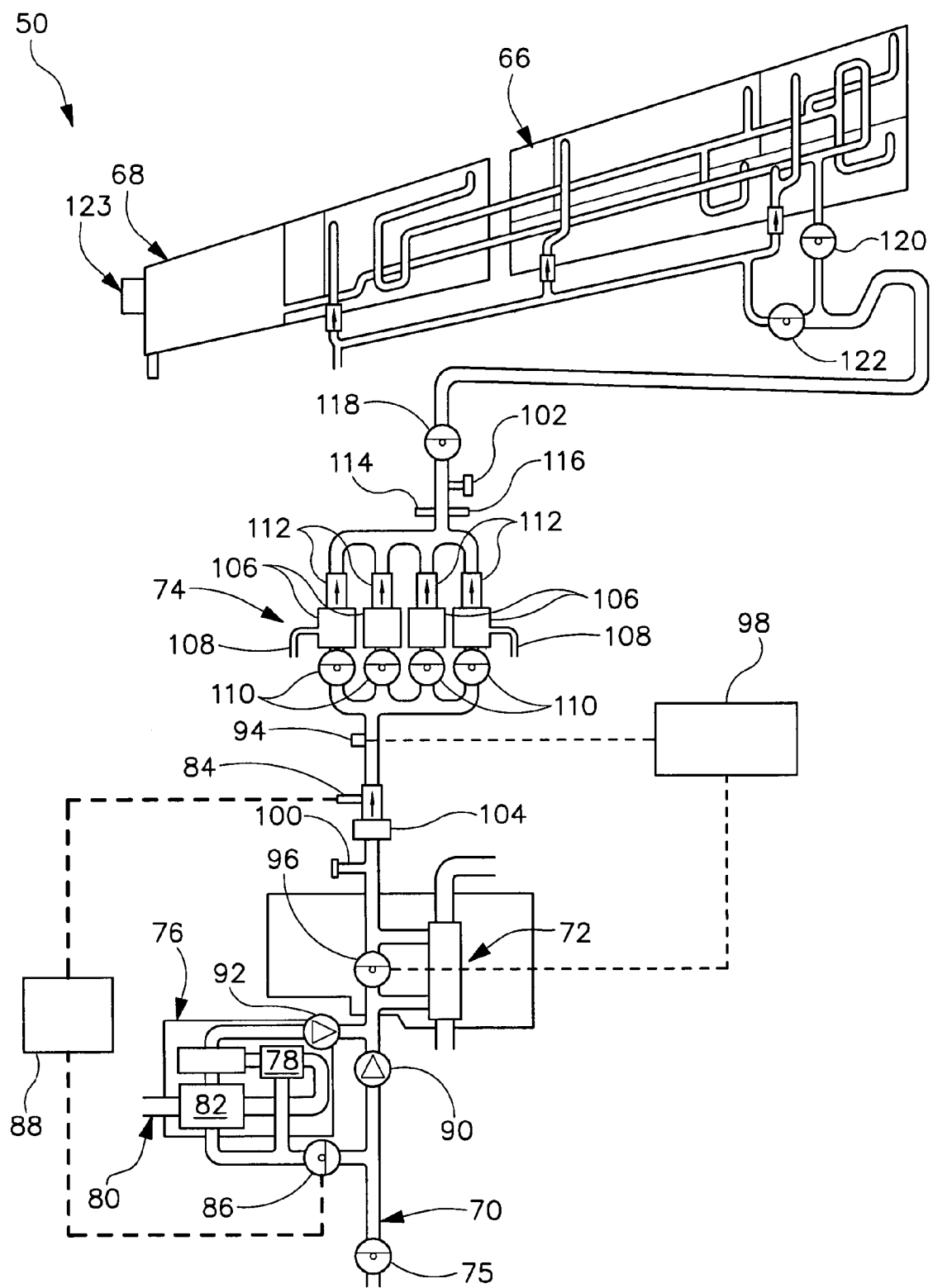
FIG. 3 is a schematic plan of the inert gas generating system shown in FIG. 2.
Figure 4:
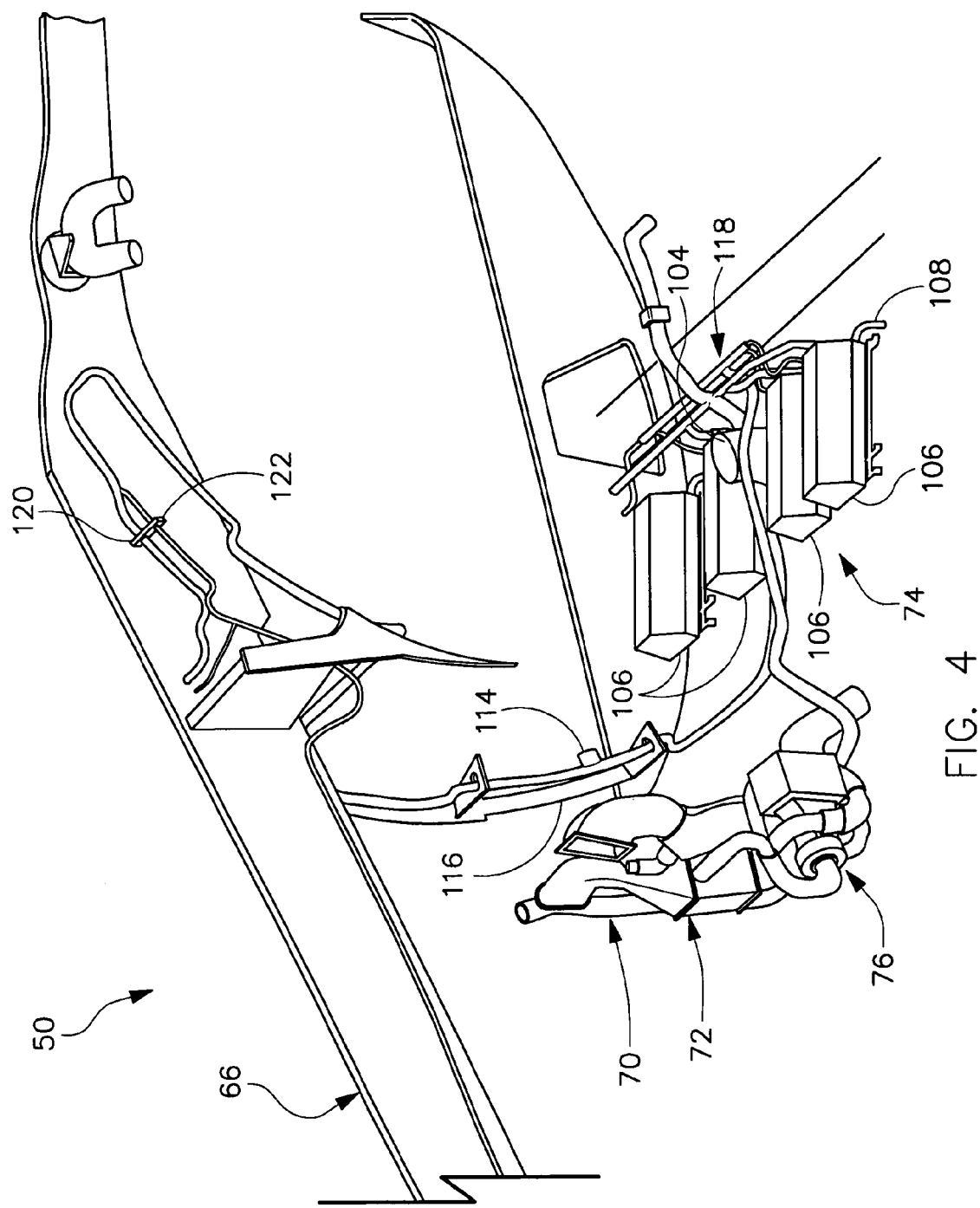
FIG. 4 is a perspective of the inert gas generating system shown in FIG. 2.

As illustrated in FIGS. 3 and 4, the inert gas generating system 50 includes an inlet (generally designated by 70), a heat exchanger (generally designated by 72) downstream from the inlet and in fluid communication with the inlet, and a gas separation module assembly (generally designated by 74) downstream from the heat exchanger and in fluid communication with the heat exchanger. The inlet 70 is in fluid communication with a gas source (e.g., ambient air entering the power plants 56 (FIG. 2)) for receiving a flow of gas (e.g., air) having a nitrogen component and an oxygen component. As illustrated in FIG. 3, a system shut-off valve 75 is operatively connected upstream from the inlet 70 between the inlet and the gas source for selectively controlling operation of the system 50, and more specifically for selectively allowing gas to flow through the inlet and into the system 50.

As illustrated in FIGS. 3 and 4, a compressor (generally designated by 76) is operatively connected between the inlet 70 and the heat exchanger 72 to increase a pressure of gas received by the heat exchanger. More specifically, the compressor 76 is downstream from and in fluid communication with the inlet 70 for receiving gas from the inlet, and upstream from and in fluid communication with the heat exchanger 72. In one embodiment, operation of the compressor 76 is driven by gas received from the inlet 70. More specifically, as illustrated in FIG. 3, in one embodiment the compressor 76 includes a turbine 78, and a portion of the gas received from the inlet is delivered to the turbine to drive operation of the compressor before exiting the turbine through an outlet (generally designated by 80) as waste gas. In one embodiment, a heat exchanger 82 is operatively connected to the outlet 80 to pre-condition the portion of the gas compressed by the compressor 76.

A conventional pressure sensor 84 is operatively connected downstream from the compressor 76 to measure a pressure of gas downstream from the compressor. In the exemplary embodiment, the pressure sensor 84 is operatively connected downstream from the heat exchanger 72 for measuring a pressure of gas downstream from the heat exchanger 72. A compressor regulator valve 86 is operatively connected to the compressor 76 and the pressure sensor 84 for controlling operation of the compressor based, at least in part, on the pressure of gas downstream from the compressor (in the exemplary case based on the pressure of gas downstream from the heat exchanger 72). In one embodiment, a processor 88 is operatively connected between the pressure sensor 84 and the compressor regulator valve 86 for controlling operation of the compressor regulator valve based, at least in part, on the pressure of gas downstream from the compressor (in the exemplary case based on the pressure of gas downstream from the heat exchanger 72). A bypass check valve 90 is operatively connected between the inlet 70 and the heat exchanger 72 to allow gas to bypass the compressor. The compressor 76 may also include a check valve 92 for preventing gas downstream from the compressor from flowing upstream into the compressor. Although other compressors may be used without departing from the scope of the present invention, in one embodiment the compressor 76 is a 1003811-1 Hamilton Sundstrand compressor commercially available from Hamilton Sundstrand Corporation of Windsor Locks, Conn.

As illustrated in FIGS. 3 and 4, the heat exchanger 72 is downstream from and in fluid communication with the inlet 70 for cooling gas received (sometimes through the compressor 76) from the inlet. In one embodiment, the heat exchanger 72 is a component of the environmental control system 58 (FIG. 2). Alternatively, the heat exchanger 72 is separate from the environmental control system 58 and/or uses a cooling medium other than air. As illustrated in FIG. 3, a conventional temperature sensor 94 is operatively connected downstream from the heat exchanger 72 to measure a temperature of gas downstream from the heat exchanger, and a heat exchanger bypass valve 96 is operatively connected between the inlet 70 and the gas separation module assembly 74 to allow gas to bypass the heat exchanger. The heat exchanger bypass valve 96 is operatively connected to the temperature sensor 94 for controlling the temperature of the gas received by the gas separation module assembly 74 based, at least in part, on the temperature of gas downstream from the heat exchanger 72. More specifically, by allowing at least a portion of the gas flowing downstream to the heat exchanger to bypass the heat exchanger and mix downstream with gas exiting the heat exchanger, a temperature of the gas received by the gas separation module assembly 74 can be controlled. In one embodiment, multiple temperature sensors 94 are used to protect the gas separation module assembly 74 from exposure to high temperatures during failure conditions. In one embodiment, a processor 98 is operatively connected between the temperature sensor 94 and the heat exchanger bypass valve 96 for controlling operation of the heat exchanger bypass valve based, at least in part, on the temperature of the gas downstream from the heat exchanger 72. Alternatively, the temperature of the gas received by the gas separation module 74 is controlled by regulating a flow rate and/or temperature of a cold side fluid (not shown) of the heat exchanger 72.

A ground connection port 100 may be operatively connected between the heat exchanger 72 and the gas separation module assembly 74 for introducing gas to the assembly from a pre-conditioned gas source (not shown) external to the aircraft 52 (FIG. 2). The ground connection port 100 may be used exclusively to introduce air or it may be used to supplement gas from the inlet 70 (and ultimately the heat exchanger 72). The ground connection port 100 thus allows the inert gas generating system 50 to operate without electrical power when the system is supplied with compressed gas from the pre-conditioned gas-source. Additionally, the ground connection port 100 allows removal of at least some gas from the inert gas generation system 50 between the heat exchanger 72 and the gas separation module assembly 74 to drive operation of a pressure intensifier (not shown). The pressure intensifier may be used to increase the pressure of gas removed from the system 50 downstream from the gas separation module assembly 74, using for example a ground connection port 102 described below.

As illustrated in FIGS. 3 and 4, in one embodiment a filter 104 is operatively connected between the heat exchanger 72 and the gas separation module assembly 74 to filter entrained moisture and/or particulate contaminants from gas flowing between the heat exchanger and the gas separation module assembly. Although other filters may be used without departing from the scope of the present invention (e.g., hydrocarbon vapor or ozone converters), in one embodiment the filter 104 is a CE011051 filter commercially available from Pall Corporation of Clearwater, Fla.

As discussed above, the gas separation module assembly 74 is downstream from and in fluid communication with the heat exchanger 72 for separating gas received from the heat exchanger into a nitrogen-enriched gas flow and an oxygen-enriched gas flow. The oxygen-enriched gas flow is discharged from the inert gas generating system 50 through an outlet 108 as waste gas. Alternatively, the discharged oxygen-enriched gas flow is used to provide breathable air to passenger and/or flight crew compartments (not shown) within the aircraft 52 (FIG. 2) The gas separation module assembly 74 may include a plurality of gas separation modules 106 for separating gas received from the heat exchanger into a nitrogen-enriched gas flow and an oxygen-enriched gas flow. Alternatively, the gas separation module assembly 74 may include only one gas separation module 106.

Although other types of gas separation modules (e.g., pressure-swing adsorption modules) may be used without departing from the scope of the present invention, in one embodiment the gas separation modules 106 are permeable membrane gas separation modules, such as Carleton Life Support System 3261166-0101 Air Separation Modules, commercially available from Carleton Life Support Systems of Davenport, Iowa. Alternatively, the gas separation module assembly 74 includes a combination of different types of gas separation modules 106. As illustrated in FIG. 3, in one embodiment each gas separation module 106 includes a shut-off valve 110 for controlling gas flow into each of the modules. The shut-off valves 110 allow each gas separation module 106 to operate individually during operation of the system 50 for supplying the fuel tank 66 and for operational testing of each module 106 by maintenance personnel. In one embodiment, the gas separation module assembly 74 includes a check valve 112 for preventing gas downstream from the assembly from flowing upstream into the gas separation modules 106.

As illustrated in FIGS. 3 and 4, a flow rate sensor 114 may be operatively connected downstream from the gas separation module assembly 74 to measure a flow rate and/or a pressure of the nitrogen-enriched gas flow downstream from the assembly. Additionally, an oxygen sensor 116 may be operatively connected downstream from the gas separation module assembly 74 to measure an oxygen concentration of the nitrogen-enriched gas flow downstream from the assembly.

As illustrated in FIG. 3, a ground connection port 102 is operatively connected downstream from the gas separation module assembly 74 for introducing nitrogen-enriched gas from a nitrogen-enriched gas source (not shown) external to the aircraft 52 (FIG. 2) to the fuel tank 66 instead of, or in addition to, the nitrogen-enriched gas flow generated by the gas separation module assembly. The ground connection port 100 thus allows the inert gas generating system 50 to operate without electrical power when supplied with compressed gas from the pre-conditioned gas-source. The ground connection port 102 also allows withdrawal of nitrogen-enriched gas from the nitrogen-enriched gas flow generated by the gas separation module assembly 74, as discussed above.

A series of valves 118, 120, 122 are operatively connected downstream from the gas separation module assembly 74 to deliver the nitrogen-enriched gas flow from the gas separation module assembly 74 to the fuel tank 66, as described below. Although the ground connection port 102, the flow rate sensor 114, and the oxygen sensor 116 are operatively connected upstream from the valves 118, 120, 122 in the exemplary embodiment, the port 102 and the sensors 114, 116 may be operatively connected at any suitable location downstream from the gas separation module assembly 74 with respect to the valves 118, 120, 122 without departing from the scope of the present invention.

Specifically, a flow valve 118 is operatively connected downstream from the gas separation module assembly 74 to control a flow rate of the nitrogen-enriched gas flow received from the assembly. In the exemplary embodiment, the flow valve 118 is a two-position valve having an open position allowing a first (e.g., higher) flow rate of the nitrogen-enriched gas to flow downstream from the flow valve, and a closed position allowing a second (e.g., lower) flow rate of the nitrogen-enriched gas to flow downstream from the valve. However, in other embodiments the flow valve 118 has a multiplicity of positions producing any number and/or combination of flow rates of the nitrogen-enriched gas downstream from the valve. Accordingly, the flow valve 118 may generally provide more control over the flow rate of the nitrogen-enriched gas downstream from the valve than in the exemplary embodiment. Although other valves may be used without departing from the scope of the present invention, in one embodiment the flow valve 118 is a 1003822 Hamilton Sundstrand valve commercially from Hamilton Sundstrand Corporation.

The inert gas generating system 50 is adapted to deliver nitrogen-enriched gas from the nitrogen-enriched gas flow to the fuel tank 66 through the fuel tank vent 68, and is adapted to deliver nitrogen-enriched gas from the nitrogen-enriched gas flow to the fuel tank without delivering the nitrogen-enriched gas through the fuel tank vent. More specifically, a fuel tank vent valve 120 is operatively connected between the gas separation module assembly 74 and the fuel tank vent 68 to control a flow rate of nitrogen-enriched gas into the fuel tank vent (and ultimately to the fuel tank 66), and a fuel tank valve 122 operatively connected between the gas separation module assembly and the fuel tank to control a flow rate of the nitrogen-enriched gas into the fuel tank (not through the vent 68). In the exemplary embodiment, the valve 120 is a two-position valve having an open position allowing flow through the valve 120 into the fuel tank vent 68 (and ultimately the fuel tank 66), and a closed position restricting flow through the valve 120 into the fuel tank vent. Additionally, in the exemplary embodiment the valve 122 is a two-position valve having an open position allowing flow through the valve 122 into the fuel tank 66, and a closed position restricting flow through the valve 122 into the fuel tank. However, in other embodiments the valves 120, 122 have a multiplicity of positions producing any number and/or combination of flow rates of the nitrogen-enriched gas into the fuel tank vent 68 and the fuel tank 66, respectively. Accordingly, the valves 120, 122 may generally provide more control over the flow rate of the nitrogen-enriched gas into the fuel tank 66 and the fuel tank vent 68, respectively, than in the exemplary embodiment. In another embodiment, a plurality of valves may be used in place of the valve 122 and/or the valve 120 to regulate the nitrogen-enriched gas flow to the fuel tank 66 and the fuel tank vent 68, respectively. Although other valves may be used without departing from the scope of the present invention, in one embodiment the valves 120, 122 are 1003823 Hamilton Sundstrand valve commercially from Hamilton Sundstrand Corporation.

Additionally, although the valves 118, 120, 122 are illustrated and described herein in the exemplary manner, it is envisioned that any suitable configuration and/or number of valves may be used to deliver nitrogen-enriched gas to the fuel tank 66 through the fuel tank vent 68, and to deliver nitrogen-enriched gas to the fuel tank without delivering the nitrogen-enriched gas through the fuel tank vent.

The flow of nitrogen-enriched gas from the gas separation module assembly 74 into the fuel tank 66 is controlled by the various combined positions of the valves 118, 120, 122. Specifically, flow is be controlled by the flow valve 118 and thereafter directed into either or both of the valves 120, 122 ultimately for delivery to the fuel tank 66. Accordingly, by setting the positions of the valves 118, 120, 122 in a variety of different combinations, a multiplicity of unique flow rates of the nitrogen-enriched gas flow can be delivered into the fuel tank 68. The inert gas generation system 50 can therefore deliver the nitrogen-enriched gas flow from the gas separation module assembly 74 to the fuel tank 66 at a specific flow rate corresponding to a specific operating condition (e.g., descent or climb) of the aircraft 52 (FIG. 2), as described below. Although the oxygen concentration of the nitrogen-enriched gas is higher when the flow rate of air through the gas separation module assembly 74 is higher, the assembly generates flow rates having an oxygen concentration low enough to generally keep the nitrogen-enriched gas inert even during very high flow rates. Table 1 is an example of flow rates and oxygen concentrations for various operating conditions of the aircraft.

TABLE 1

| Operating Condition | NEA Flow (lb/min) | Maximum Oxygen Concentration (% by vol.) |
| --- | --- | --- |
| Cruise | 1 | 5 |
| Fuel Tank Initialization | 9 | 8.7 |
| Climb | 11 | 8.7 |
| Descent | 16 | 9.8 |
| Rapid Descent | 40 | 9.8 |

In one embodiment, the inert gas generation system 50 illustrated in FIGS. 3 and 4 delivers a multiplicity of flow rates ranging from about 1 pound per minute (lb/min) to about 40 lb/min, and each unique flow rate has an oxygen concentration of less than about 9.8 percent by volume. Accordingly, the inert gas generation system 50 delivers a nitrogen-enriched gas flow to the fuel tank 66 when it is required by the tank and at a flow rate sufficient to ensure the gas above the fuel in the tank is incombustible during any operational condition of the aircraft 52 (FIG. 2). It is therefore not necessary to store any of the inert gas generated by the assembly 74 for future use or to charge the system 50 with a predetermined amount of nitrogen-enriched gas before operation of the vehicle. Rather, the nitrogen-enriched gas flow is delivered from the gas separating module assembly 74 to the fuel tank 66 without generally stagnating between the assembly and the tank. In other embodiments, the maximum allowable oxygen concentrations could be higher or lower without departing from the scope of the present invention.

During some operating conditions of the aircraft 52 (FIG. 2), the pressure in the fuel tank vent 68 (FIG. 3) is generally equal to the pressure in the fuel tank 68. Under such circumstances any nitrogen-enriched gas flowing into the fuel tank vent 68 will be exhausted through an exhaust outlet 123.

In operation, the inlet receives a flow of gas, such as air, from the gas source, the heat exchanger 72 cools gas received from the inlet 70, the filter 104 and the gas separation module assembly 74 separates the gas supplied from the heat exchanger into an oxygen-enriched gas flow and a nitrogen-enriched gas flow. The nitrogen-enriched gas flow is then delivered from the gas separation module assembly 74 to the fuel tank 66 as required during operation of the aircraft 52 (FIG. 2) to ensure the gas above the fuel in the tank is incombustible, as described above. To achieve the desired flow rates of nitrogen-enriched gas to the fuel tank 66, operation of the system 50 and associated components of the aircraft 52 (FIG. 2) may be based on the measurements of the flow sensor 114, the oxygen sensor 116, the temperature sensor 94, and/or the pressure sensor 84.

To warm the gas separating modules 106 before operation of the aircraft 52 (FIG. 2), the compressor regulator valve 80 is closed so that the compressor bypass check valve 90 opens to cause all of the gas flowing from the inlet 70 to the heat exchanger 72 to bypass the compressor 76. Additionally, the valves 118, 120, 122 are each opened to deliver nitrogen-enriched gas to the fuel tank 66 through the fuel tank vent 68 and to the fuel tank without being delivered through the fuel tank vent. This arrangement produces a generally high flow rate of gas through the gas separating modules 106 to warm them for operation. In one embodiment, the nitrogen-enriched gas is delivered to the fuel tank 66 at flow rate of about 26 lb/min and an oxygen concentration of about 16 percent by volume to warm the gas separating modules 106.

During initial operation of the aircraft 52 (FIG. 2) on the ground following the previously described warm-up and when the aircraft is climbing, the compressor regulator valve 80 is closed so that the compressor bypass check valve 90 opens so all of the gas flowing from the inlet 70 to the heat exchanger 72 bypasses the compressor 76. Additionally, the valves 118, 122 are each opened to deliver nitrogen-enriched gas to the fuel tank 66 without passing through the fuel tank vent 68. The fuel tank vent valve 120 is closed to prevent nitrogen-enriched gas from being delivered to the fuel tank vent 68. This arrangement produces a flow rate of the nitrogen-enriched gas to the fuel tank 66, which is generally lower than the flow rate during warming of the gas separation modules 106. Further, this flow rate is sufficient to supply the tank during initial operation on the ground and when the aircraft is climbing to ensure the gas above the fuel in the tank 66 is incombustible. In one embodiment, during initial operation of the aircraft 52 (FIG. 2) on the ground and when the aircraft is climbing, the nitrogen-enriched gas is delivered to the fuel tank 66 at a predetermined rate generally sufficient to ensure the gas above the fuel in the tank is incombustible. Alternatively, during initial operation of the aircraft 52 (FIG. 2) on the ground and when the aircraft is climbing, the flow rate of nitrogen-enriched gas delivered to the fuel tank 66 can be adjusted during operation of the aircraft. Although other flow rates may be used without departing from the scope of the present invention, in one embodiment during initial operation of the aircraft 52 (FIG. 2) on the ground the nitrogen-enriched gas is delivered to the fuel tank 66 at flow rate of about 9 lb/min and an oxygen concentration of about slightly less than about 8.7 percent by volume. Additionally, although other flow rates may be used without departing from the scope of the present invention, in one embodiment during climb the nitrogen-enriched gas is delivered to the fuel tank 66 at a flow rate of about 11 lb/min and an oxygen concentration of well below 8.7 percent by volume. The flow rate is higher and the oxygen concentration is lower during climb because the supplied pressure is greater even though the valves 80, 90, 118, 122, 120 are in the same configuration.

When the aircraft 52 (FIG. 2) is cruising at a generally constant altitude, the compressor regulator valve 80 is closed so that the compressor bypass check valve 90 opens so all of the gas flowing from the inlet 70 to the heat exchanger 72 bypasses the compressor 76. Additionally, the valve 118 is closed to provide the second (lower) flow rate of the nitrogen-enriched gas downstream from the valve 118. The valve 120 is opened to deliver nitrogen-enriched gas from the valve 118 to the fuel tank 66 through the fuel tank vent 68. The fuel tank valve 122 is closed to prevent nitrogen-enriched gas from being delivered to the fuel tank 66 without passing through the fuel tank vent 68. This arrangement produces a low flow rate of the nitrogen-enriched gas to the fuel tank 66, which is generally lower than the flow rate during initial operation of the aircraft 52 (FIG. 2) on the ground and when the aircraft is climbing. Further this flow rate is sufficient to supply the tank when the aircraft 52 is cruising at a generally constant altitude to ensure the gas above the fuel in the tank 66 is incombustible. In one embodiment, when the aircraft 52 (FIG. 2) is cruising at a generally constant altitude, the nitrogen-enriched gas is delivered to the fuel tank 66 at a predetermined rate generally sufficient to ensure the gas above the fuel in the tank is incombustible. Alternatively, when the aircraft 52 (FIG. 2) is cruising at a generally constant altitude, the flow rate of the nitrogen-enriched gas delivered to the fuel tank 66 can be adjusted or shut off periodically during operation of the aircraft. Although other flow rates may be used without departing from the scope of the present invention, in one embodiment when the aircraft 52 (FIG. 2) is cruising at a generally constant altitude the nitrogen-enriched gas is delivered to the fuel tank 66 at flow rate of about 1 lb/min and an oxygen concentration of about 5 percent by volume.

In one embodiment, when the aircraft 52 (FIG. 2) is cruising at a generally constant altitude, the system 50 may be periodically operated as if the aircraft is on the ground or climbing to sweep oxygen that evolved from the fuel within the fuel tank. More specifically, as described above the valves 118, 122 are each opened to deliver nitrogen-enriched gas to the fuel tank 66 without passing through the fuel tank vent 68. The fuel tank vent valve 120 is closed to prevent nitrogen-enriched gas from being delivered to the fuel tank vent 68. This arrangement produces a higher flow rate of the nitrogen-enriched gas to the fuel tank 66 than when the aircraft 52 (FIG. 2) is cruising at generally constant altitude so that oxygen that was dissolved in the fuel and has escaped from the fuel into the gas above the fuel in the tank is swept from the tank when the aircraft is cruising at a generally constant altitude.

When the aircraft 52 (FIG. 2) is descending, the compressor regulator valve 80 is set closed so that the compressor bypass check valve 90 opens so all of the gas flowing from the inlet 70 to the heat exchanger 72 bypasses the compressor 76. Additionally, the valves 118, 120 are each opened to deliver nitrogen-enriched gas to the fuel tank 66 through the fuel tank vent 68. The fuel tank valve 122 is closed to prevent nitrogen-enriched gas from being delivered to the fuel tank 66 without passing through the fuel tank vent 68. This arrangement produces a generally high flow rate of the nitrogen-enriched gas to the fuel tank 66, which is generally lower than the flow rate during warming of the gas separation modules 106 and generally higher than the flow rate during initial operation of the aircraft 52 (FIG. 2) on the ground and during climb. Further, this flow rate is sufficient to supply the fuel tank 66 when the aircraft 52 is descending to ensure the gas above the fuel in the tank is incombustible. In one embodiment, when the aircraft 52 (FIG. 2) is descending, the nitrogen-enriched gas is delivered to the fuel tank 66 at a predetermined rate generally sufficient to ensure the gas above the fuel in the tank is incombustible. Alternatively, when the aircraft 52 (FIG. 2) is descending, the flow rate of nitrogen-enriched gas delivered to the fuel tank 66 can be adjusted during operation of the aircraft. Although other flow rates may be used without departing from the scope of the present invention, in one embodiment when the aircraft 52 (FIG. 2) is descending the nitrogen-enriched gas is delivered to the fuel tank 66 at flow rate of about 16 lb/min and an oxygen concentration of slightly less than about 9.8 percent by volume.

When the aircraft 52 (FIG. 2) is descending faster than a predetermined rate (e.g., 3000 feet per minute) at which the approach for the descents described above would not ensure the gas above the fuel in the tank 66 remained incombustible, the compressor regulator valve 80 is activated to operate the compressor 76 and the compressor bypass check valve 90 closes to allow at least some of the gas flowing from the inlet 70 to be compressed by the compressor before entering the heat exchanger 72. The compressor 76 raises the pressure of the gas received by the gas separation module assembly 74 from the heat exchanger 72 so the oxygen concentration in the nitrogen-enriched gas will remain low enough so the nitrogen-enriched gas is inert during the high flow rate demands when the aircraft is descending faster than the predetermined rate. Operation of the compressor 76 may be based on the measurements of the flow sensor 114, the oxygen sensor 116, the temperature sensor 94, and/or the pressure sensor 84 to achieve the desired pressure of the gas received by the assembly 74 and the desired oxygen concentration of the nitrogen-enriched gas. Although other pressures may be used without departing from the scope of the present invention, in one embodiment when the aircraft 52 (FIG. 2) is descending faster than the predetermined rate the pressure of the gas received by the gas separation module assembly 74 is about 75 pounds per square inch (psi).

Additionally, when the aircraft 52 (FIG. 2) is descending faster than the predetermined rate, the valves 118, 120, 122 are each opened to deliver nitrogen-enriched gas to the fuel tank 66 through the fuel tank vent 68 and to the fuel tank without passing through the fuel tank vent. This arrangement produces a generally high flow rate of the nitrogen-enriched gas to the fuel tank 66, which is generally higher than any of the flow rates for the operation conditions of the aircraft 52 (FIG. 2) discussed above. Further, this flow rate is sufficient to supply the tank when the aircraft 52 is descending faster than the predetermined rate to ensure the gas above the fuel in the tank 66 is in combustible. In one embodiment, when the aircraft 52 (FIG. 2) is descending faster than the predetermined rate, the nitrogen-enriched gas is delivered to the fuel tank 66 at a predetermined rate generally sufficient to ensure the gas above the fuel in the tank is incombustible. Alternatively, when the aircraft 52 (FIG. 2) is descending faster than the predetermined rate, the flow rate of nitrogen-enriched gas delivered to the fuel tank 66 can be adjusted during operation of the aircraft. Although other flow rates may be used without departing from the scope of the present invention, in one embodiment when the aircraft 52 (FIG. 2) is descending faster than the predetermined rate the nitrogen-enriched gas is delivered to the fuel tank 66 at flow rate of about 40 lb/min and an oxygen concentration of slightly less than about 9.8 percent by volume.

In one embodiment, the heat exchanger 72 supplies gas to the gas separation module assembly 74 at a unique temperature for each unique flow rate of the nitrogen-enriched gas flow, and thus at a unique temperature for each operating condition of the aircraft. Supplying gas to the gas separation module assembly 74 at a unique temperature for each unique flow rate of the nitrogen-enriched gas flow may help the gas separation module assembly 74 generate nitrogen-enriched gas flows having lower oxygen concentrations when the aircraft 52 (FIG. 2) is on the ground and when the aircraft is climbing and more bleed air is available from the engine, yet conserving bleed when the aircraft is descending or cruising at a generally constant altitude. Operation of the heat exchanger 72 to achieve the desired temperature of gas supplied to the assembly 74 may be based on the measurements of the flow sensor 114, the oxygen sensor 116, the temperature sensor 94, and/or the pressure sensor 84.

Although the inert gas generating system 50 is illustrated in FIGS. 3 and 4 as supplying the nitrogen-enriched gas flow to only one fuel tank 66, the system 50 may supply a plurality of fuel tanks on the aircraft 52 (e.g., both fuel tanks 66 or other fuel tanks on the aircraft). Additionally, in one embodiment the system 50 supplies the nitrogen-enriched gas flow to only one of the fuel tanks 66 and another inert gas generating system (not shown) supplies a nitrogen-enriched gas flow to the other fuel tank 68. In such an embodiment wherein each of the fuel tanks 66 is supplied by a separate inert gas generating system, the separate inert gas generating systems may fluidly communicate such that nitrogen-enriched gas can be exchanged between the two systems.

In one embodiment, a health and status of the system 50 is monitored by a processor (not shown). The processor may indicate a warning upon failure of components of the system 50 that could cause the fuel tank 66 to combust. Additionally, the processor may determine and display a time required for the tank 66 to become generally incombustible when the system 50 is activated (or in response to certain detected failures). Although other factors may be used without departing from the scope of the present invention, in one embodiment factors that influence the time required for the tank 66 to become generally incombustible may include ambient temperature, ambient pressure, fuel quantity, elapsed time the system 50 has been deactivated, and/or detected failures of component(s) of the system. Additionally, the processor may determine and display a maximum rate at which the aircraft 52 can descend while the system 50 keeps the tank 66 generally incombustible. Although other factors may be used without departing from the scope of the present invention, in one embodiment factors that influence this maximum descent rate include fuel quantity, a status of system 50, a status of an anti-ice system (not shown), and detected failures of component(s) of the system.

The above-described inert gas generating systems are cost-effective and reliable for generating inert gas on a vehicle and supplying the inert gas to a fuel tank at a flow rate sufficient to prevent the tank from combusting during any operational condition of the vehicle. The systems generate a nitrogen-enriched gas flow when it is required by the fuel tank at a flow rate sufficient to ensure the gas above the fuel in the tank is incombustible. The systems can therefore generally make a vehicle fuel tank inert shortly after operation of the system begins, and therefore the vehicle can be quickly prepared for operation. Specifically, the systems deliver the nitrogen-enriched gas flow from a gas separation module assembly to the fuel tank at a multiplicity of unique flow rates, wherein each flow rate corresponds to a different operating condition of the vehicle and has an oxygen concentration low enough to be generally inert. It is therefore not necessary to compress and store any gas generated by the systems for future use or to charge the systems with compressed gas before operation of the vehicle. Accordingly, no stored gas is present on the vehicle that may leak and present problems when the vehicle is not operating. The systems are generally simpler and use fewer parts than similar conventional systems by eliminating components such as the traditional storage compressors and tanks and their associated components (e.g., regulating valves, plumbing, etc.) Additionally, some components, such as the storage compressors and tanks, that have traditionally been difficult to access and replace and/or maintain have been eliminated, thereby reducing weight and cost of maintaining and operating the systems. The systems also generally operate at lower pressures than similar conventional systems, and therefore are much less sensitive to leakage.

Although the invention is herein described and illustrated in association with an aircraft, and more specifically, in association with generating inert gas on an aircraft for fuel tank inerting, it should be understood that the present invention is generally applicable to the generation of inert gas on any vehicle, for any purpose (e.g., inerting compartments other than fuel tanks), and/or in any context. Accordingly, practice of the present invention is not limited to the generation of inert gas on an aircraft or the generation of inert gas for inerting a fuel tank, nor is practice of the present invention limited to aircraft generally or any specific aircraft described and/or illustrated herein.

Exemplary embodiments of inert gas generating systems are described above in detail. The systems are not limited to the specific embodiments described herein, but rather, components of each system may be utilized independently and separately from other components described herein. Each inert gas generating system component can also be used in combination with other inert gas generating system components.

When introducing elements of the present invention or the preferred embodiment(s) thereof, the articles "a", "an", "the" and "said" are intended to mean that there are one or more of the elements. The term "plurality" is intended to mean there are two or more of the corresponding elements. The term "multiplicity" is intended to mean that there are three or more of the corresponding elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative a limiting sense.

What is claimed is:

1. A method of generating inert gas on a vehicle for supplying the inert gas to a fuel tank, said method comprising:
   supplying a flow of gas having a nitrogen component and an oxygen component to a gas separating module;
   separating the flow of gas into a nitrogen-enriched gas flow and an oxygen-enriched gas flow using the gas separating module, wherein the nitrogen-enriched gas flow has an oxygen concentration low enough that the nitrogen-enriched gas flow is generally inert; and
   selectively delivering nitrogen-enriched gas flow from the gas separating module to the fuel tank without delivering the nitrogen-enriched gas through a fuel tank vent, and selectively delivering nitrogen-enriched gas from the nitrogen-enriched gas flow to the fuel tank vent, wherein the nitrogen-enriched gas is delivered to the fuel tank at a multiplicity of unique flow rates, each unique flow rate of said multiplicity of flow rates corresponding to a different operating condition of the aircraft.

2. A method in accordance with claim 1 wherein said nitrogen-enriched gas flow is delivered to the fuel tank at a pre-determined flow rate generally sufficient to ensure the gas above the fuel in the tank is incombustible when the vehicle is on the ground and when the vehicle is climbing.

3. A method in accordance with claim 1 wherein said nitrogen-enriched gas flow is delivered to the fuel tank at a pre-determined flow rate generally sufficient to ensure the gas above the fuel in the tank is incombustible when the vehicle is cruising at a generally constant altitude.

4. A method in accordance with claim 3 wherein said nitrogen-enriched gas flow delivered to the fuel tank is restricted to the predetermined flow rate using at least a flow valve.

5. A method in accordance with claim 1 wherein said nitrogen-enriched gas flow is delivered to the fuel tank at a pre-determined flow rate generally sufficient to ensure the gas above the fuel in the tank is incombustible when the vehicle is descending.

6. A method in accordance with claim 5 wherein the fuel tank includes a fuel tank vent and said nitrogen-enriched gas flow is delivered to the fuel tank without passing through the fuel tank vent and said nitrogen-enriched gas flow is delivered to the fuel tank through the fuel tank vent when the vehicle is descending faster than a predetermined descent rate.

7. A method in accordance with claim 1 wherein said supplying the gas to the gas separating module comprises supplying the gas at a unique temperature for each unique flow rate of the nitrogen-enriched gas flow.

8. A method in accordance with claim 1 wherein the fuel tank includes a fuel tank vent, said method further comprising warming the gas separating module by delivering a first portion of said nitrogen-enriched gas flow to the fuel tank through the fuel tank vent and delivering a second portion of said nitrogen-enriched gas flow to the fuel tank without delivering the second portion through the fuel tank vent.

9. A method in accordance with claim 1 further comprising compressing the gas before supplying the gas to the gas separating module.

10. A method in accordance with claim 1 further comprising cooling the gas before supplying the gas to the gas separating module.

11. A method in accordance with claim 1 further comprising filtering at least one of entrained moisture and particulate contaminants from the gas before supplying the gas to the gas separating module.

12. A method in accordance with claim 1 further comprising, when the vehicle is cruising at a generally constant altitude, delivering said nitrogen-enriched gas flow to the fuel tank at a pre-determined flow rate generally sufficient to ensure the gas above the fuel in the tank is incombustible when the vehicle is on the ground and when the vehicle is climbing.

13. A method in accordance with claim 1 further comprising displaying a time required for the fuel tank to become generally incombustible.

14. A method in accordance with claim 1 further comprising displaying a maximum rate at which the vehicle can descend while the tank is incombustible.

15. A method of generating inert gas on a vehicle for supplying the inert gas to a fuel tank having a fuel tank vent, said method comprising:
supplying a flow of gas having a nitrogen component and an oxygen component to a gas separating module;
separating the flow of gas into a nitrogen-enriched gas flow and an oxygen-enriched gas flow using the gas separating module, wherein the nitrogen-enriched gas flow has an oxygen concentration low enough that the nitrogen-enriched gas flow is generally inert;
selectively delivering nitrogen-enriched gas from the nitrogen-enriched gas flow to the fuel tank without delivering the nitrogen-enriched gas through the fuel tank vent; and
selectively delivering nitrogen-enriched gas from the nitrogen-enriched gas flow to the fuel tank vent.

16. A method in accordance with claim 15 further comprising displaying a time required for the fuel tank to become generally incombustible.

17. A method in accordance with claim 15 further comprising displaying a maximum rate at which the vehicle can descend while the tank is incombustible.

18. A method of generating inert gas on a vehicle for supplying the inert gas to a fuel tank, said method comprising:
supplying a flow of gas having a nitrogen component and an oxygen component to a gas separating module;
separating the flow of gas into a nitrogen-enriched gas flow and an oxygen-enriched gas flow using the gas separating module, wherein the nitrogen-enriched gas flow has an oxygen concentration low enough that the nitrogen-enriched gas flow is generally inert; and
delivering the nitrogen-enriched gas flow from the gas separating module to the fuel tank at a plurality of unique flow rates, wherein the flow of gas supplied to the gas separating module has a unique temperature for each unique flow rate of said plurality of unique flow rates.

19. A method in accordance with claim 18 further comprising displaying a time required for the fuel tank to become generally incombustible.

20. A method in accordance with claim 18 further comprising displaying a maximum rate at which the vehicle can descend while the tank is incombustible.

* * * * *